(12) United States Patent
Sakamoto et al.

(10) Patent No.: US 11,443,107 B2
(45) Date of Patent: Sep. 13, 2022

(54) INFORMATION PROCESSING APPARATUS AND NON-TRANSITORY COMPUTER READABLE MEDIUM STORING PROGRAM FOR CAUSING APPLICATIONS TO COLLABORATE

(71) Applicant: FUJIFILM Business Innovation Corp., Tokyo (JP)

(72) Inventors: Takeru Sakamoto, Kanagawa (JP); Misato Suzuki, Kanagawa (JP); Yu Nanjo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/151,692

(22) Filed: Jan. 19, 2021

(65) Prior Publication Data

US 2022/0100954 A1 Mar. 31, 2022

(30) Foreign Application Priority Data

Sep. 29, 2020 (JP) .............................. JP2020-163845

(51) Int. Cl.
*G06F 40/18* (2020.01)
*G06F 40/117* (2020.01)
*G06F 40/174* (2020.01)
*G06F 16/176* (2019.01)

(52) U.S. Cl.
CPC ............ *G06F 40/18* (2020.01); *G06F 16/176* (2019.01); *G06F 40/117* (2020.01); *G06F 40/174* (2020.01)

(58) Field of Classification Search
None
See application file for complete search history.

(56) References Cited

U.S. PATENT DOCUMENTS

| | | | | |
|---|---|---|---|---|
| 7,769,810 B1* | 8/2010 | Kaufman | ............... | G06F 16/176 709/205 |
| 2006/0136432 A1* | 6/2006 | Villaron | ............... | G06F 9/44505 |
| 2006/0136477 A1* | 6/2006 | Bishop | ................... | G06F 40/131 |
| 2011/0314046 A1* | 12/2011 | Burckart | ............... | G06F 16/958 707/769 |
| 2012/0089659 A1* | 4/2012 | Halevi | ................ | G06F 3/04842 709/201 |
| 2015/0052452 A1* | 2/2015 | Alekhin | ................ | H04L 65/403 715/753 |
| 2015/0341401 A1* | 11/2015 | Lee | ....................... | G06Q 10/101 715/753 |
| 2017/0109194 A1* | 4/2017 | Namihira | ............. | G06F 9/45512 |
| 2017/0371891 A1* | 12/2017 | Yazganarikan | ........ | G06F 16/185 |
| 2019/0012053 A1* | 1/2019 | Hawa | ..................... | G06F 3/0482 |
| 2019/0129973 A1* | 5/2019 | Truong | .................. | G06F 40/166 |
| 2021/0089618 A1* | 3/2021 | Jain | ........................ | G06F 40/154 |

FOREIGN PATENT DOCUMENTS

JP 2020-003905 1/2020

* cited by examiner

*Primary Examiner* — Howard Cortes
(74) *Attorney, Agent, or Firm* — JCIPRNET

(57) ABSTRACT

An information processing apparatus includes a processor configured to implement specific functions by causing plural applications to collaborate based on presettings related to collaboration among the plural applications, and operation parameters input by a user.

6 Claims, 14 Drawing Sheets

| SETTING ITEM | SETTING VALUE |
|---|---|
| initialState | 1 |
| documentType | 4 |
| folderPrefix | RPAFile- |
| interval | 3600 |
| filename | 0 |
| ... | ... |
| ... | ... |

GENERAL USER

FIG. 6

| | A | B | C | D | E | F | G |
|---|---|---|---|---|---|---|---|
| 1 | | | | | | | |
| 2 | | | PLEASE ENTER VALUES IN COLUMN G FOR INDIVIDUAL ITEMS BY REFERRING TO "DESCRIPTION OF ITEM". | | | | |
| 3 | | | | | | | |
| 4 | | | | ITEM NAME | | DESCRIPTION OF ITEM | VALUE |
| 5 | | | SETTINGS OF NAME OF FILE TO BE UPLOADED TO STORAGE | | | | |
| 6 | | | | VALUE 1 FOR USE IN FILE NAME | | SETTING OF HEADER ITEMS OF CSV FILE TO BE COMBINED INTO DOCUMENT FILE NAME. *EXAMPLE: THE FOLLOWING SETTING IS MADE TO OBTAIN FILE NAME "APPLICANT-APPLICATION DATE". VALUE 1 FOR USE IN FILE NAME / APPLICANT VALUE 2 FOR USE IN FILE NAME / APPLICATION DATE | CLIENT NAME |
| 7 | | | | VALUE 2 FOR USE IN FILE NAME | | | ISSUE DATE |
| 8 | | | | VALUE 3 FOR USE IN FILE NAME | | | DOCUMENT NAME |
| 9 | | | | VALUE 4 FOR USE IN FILE NAME | | | DOCUMENT NUMBER |
| 10 | | | | VALUE 5 FOR USE IN FILE NAME | | | |
| 11 | | | | VALUE 6 FOR USE IN FILE NAME | | | |
| 12 | | | | DELIMITER IN FILE NAME | | DELIMITER IN FILE NAME TO BE ASSIGNED TO FORM | HYPHEN |
| 13 | | | | NUMBER OF LAYERS | | NUMBER OF LAYERS OF FOLDERS TO BE CREATED IN STORAGE | 3 |
| 14 | | | | NAME OF FIRST LAYER | | FOLDER NAME IN FIRST LAYER | YEAR |
| 15 | | | | NAME OF SECOND LAYER | | FOLDER NAME IN SECOND LAYER | CLIENT NAME |
| 16 | | | | NAME OF THIRD LAYER | | FOLDER NAME IN THIRD LAYER | DOCUMENT NAME |
| 17 | | | | ...... | | ............ | |
| 18 | | | | | | | |

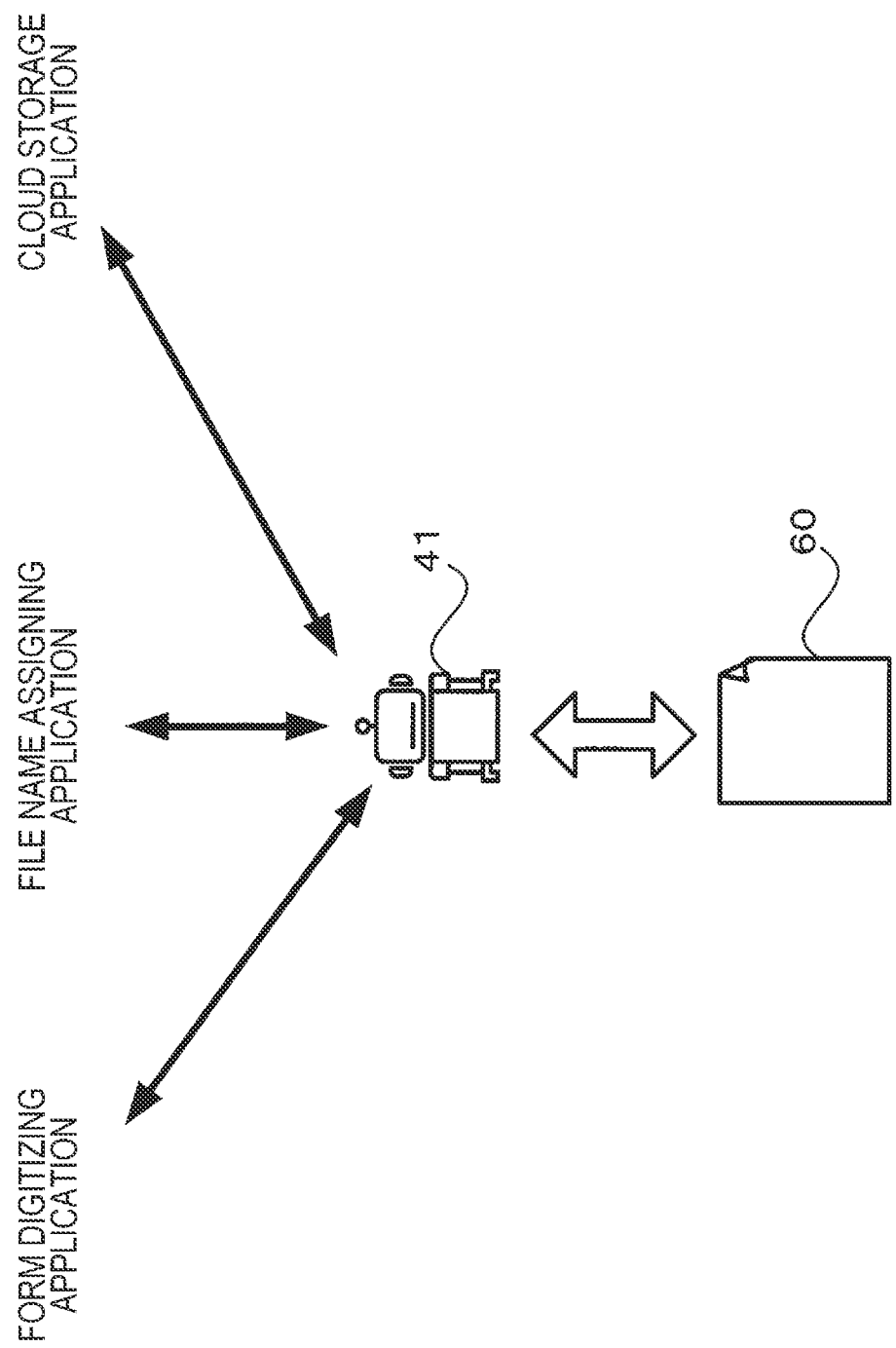

INVOICE No.: 12345678

INVOICE DATE: 5/8/2020

BILL TO XYZ COMPANY

ABC COMPANY

PLEASE FIND BELOW AN INVOICE FOR WORK OFFERED.

XXX STREET, XXX CITY
PHONE: (XXX)XXX-XXXX

CONTACT: JOHN SMITH

| No. | ITEM DESCRIPTION | QUANTITY | AMOUNT |
|---|---|---|---|
| 1 | ABCD12345 | 1 | 21,230.00 |
| 2 | AAA KIT | 1 | 1,000.00 |
| 3 | XYZ1111 | 1 | 930.00 |
| 4 | BBB DEVICE | 1 | 1,500.00 |
| 5 | EXTENSION KIT | 1 | 2,100.00 |
| 6 | INSTALLATION CHARGE | 1 | 400.00 |
|   |   |   |   |
|   |   |   |   |
|   | SUBTOTAL |   | 27,160.00 |
|   | TAX (10%) |   | 2,716.00 |

GRAND TOTAL             29,876.00

PAYMENT METHOD
DIRECT DEPOSIT
CCC BANK
ACCOUNT: 1234567

FIG. 12

|   | A | B | C | D | E | F | G |
|---|---|---|---|---|---|---|---|
| 1 | DOCUMENT NAME | DOCUMENT NUMBER | ISSUE DATE | CLIENT NAME | NAME OF REPRESENTATIVE PERSON | GRAND TOTAL | ... |
| 2 | INVOICE | 12345678 | 5/8/2020 | ABC COMPANY | JOHN SMITH | 29,876.00 | ... |

FIG. 13
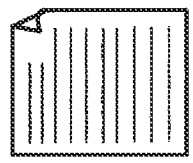
FILE NAME "ABC COMPANY–05082020–INVOICE–12345678"
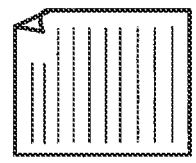
FILE NAME "XYZ COMPANY–06122020–ESTIMATION SHEET–22233987"
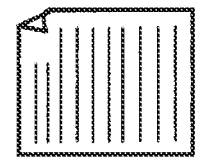
FILE NAME "AAAZZZ COMPANY–07292020–INVOICE–36985214"

INFORMATION PROCESSING APPARATUS AND NON-TRANSITORY COMPUTER READABLE MEDIUM STORING PROGRAM FOR CAUSING APPLICATIONS TO COLLABORATE

CROSS-REFERENCE TO RELATED APPLICATIONS

This application is based on and claims priority under 35 USC 119 from Japanese Patent Application No. 2020-163845 filed Sep. 29, 2020.

BACKGROUND (i) Technical Field

The present disclosure relates to an information processing apparatus and a non-transitory computer readable medium storing a program.

(ii) Related Art

Japanese Unexamined Patent Application Publication No. 2020-003905 discloses an RPA apparatus that executes a first process for acquiring, from first RPA-based software, a first output as a result of operation of the first software, and a second process for causing second RPA-based software to operate based on the first output to generate a second output as a result of operation of the second software.

SUMMARY

Aspects of non-limiting embodiments of the present disclosure relate to an information processing apparatus and a non-transitory computer readable medium storing a program, in which specific functions may be implemented by causing a plurality of applications to collaborate without user settings related to the collaboration between the applications.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to implement specific functions by causing a plurality of applications to collaborate based on presettings related to collaboration among the plurality of applications, and operation parameters input by a user.

BRIEF DESCRIPTION OF THE DRAWINGS

An exemplary embodiment of the present disclosure will be described in detail based on the following figures, wherein:

FIG. 6 illustrates an example of the setting file illustrated in FIG. 5;

FIG. 7 demonstrates that the RPA acquires the operation parameters from the setting file when causing the three applications to collaborate;

FIG. 12 illustrates an example of a CSV file generated based on the various types of information acquired from the digitized file by the RPA;

FIG. 13 illustrates examples of digitized files having file names assigned by the RPA.

DETAILED DESCRIPTION

An exemplary embodiment of the present disclosure is described in detail with reference to the drawings.

Figure 1:
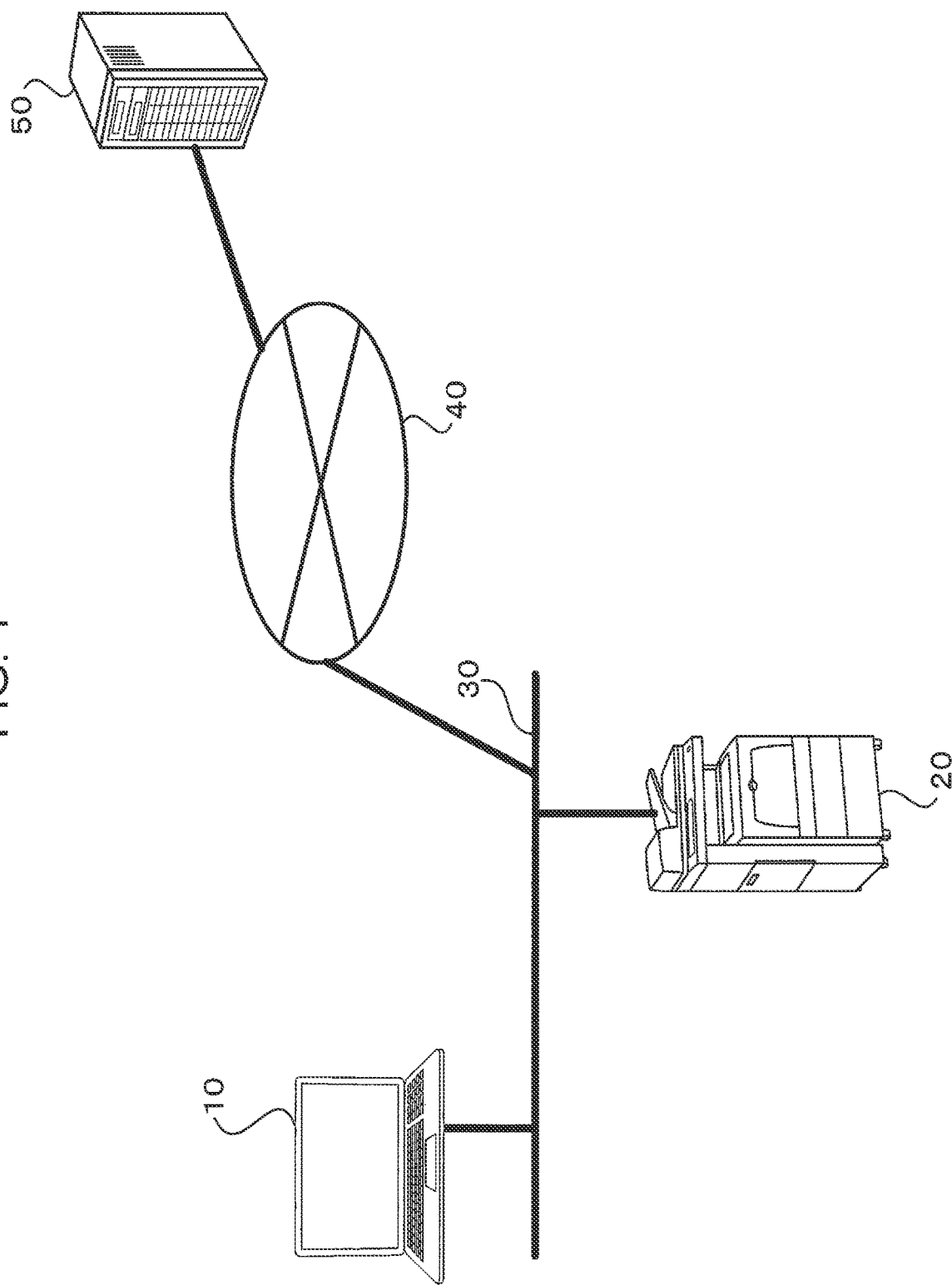
FIG. 1 illustrates the system configuration of an information processing system according to an exemplary embodiment of the present disclosure.

FIG. 1 illustrates the system configuration of an information processing system according to the exemplary embodiment of the present disclosure.

As illustrated in FIG. 1, the information processing system according to the exemplary embodiment of the present disclosure is configured such that a terminal apparatus 10 and an image forming apparatus 20 are connected via an office network 30 and the office network 30 is connected to a cloud server 50 via the Internet 40. The image forming apparatus 20 is a so-called multifunction peripheral having a plurality of functions such as a printing function, a scanning function, a copying function, and a facsimile function. The terminal apparatus 10 is an information processing apparatus that executes various processes on forms by using the image forming apparatus 20.

Robotics process automation (RPA) 41 is installed in the terminal apparatus 10 to implement specific functions by causing a plurality of application programs (hereinafter abbreviated as "applications") to collaborate.

Figure 2:
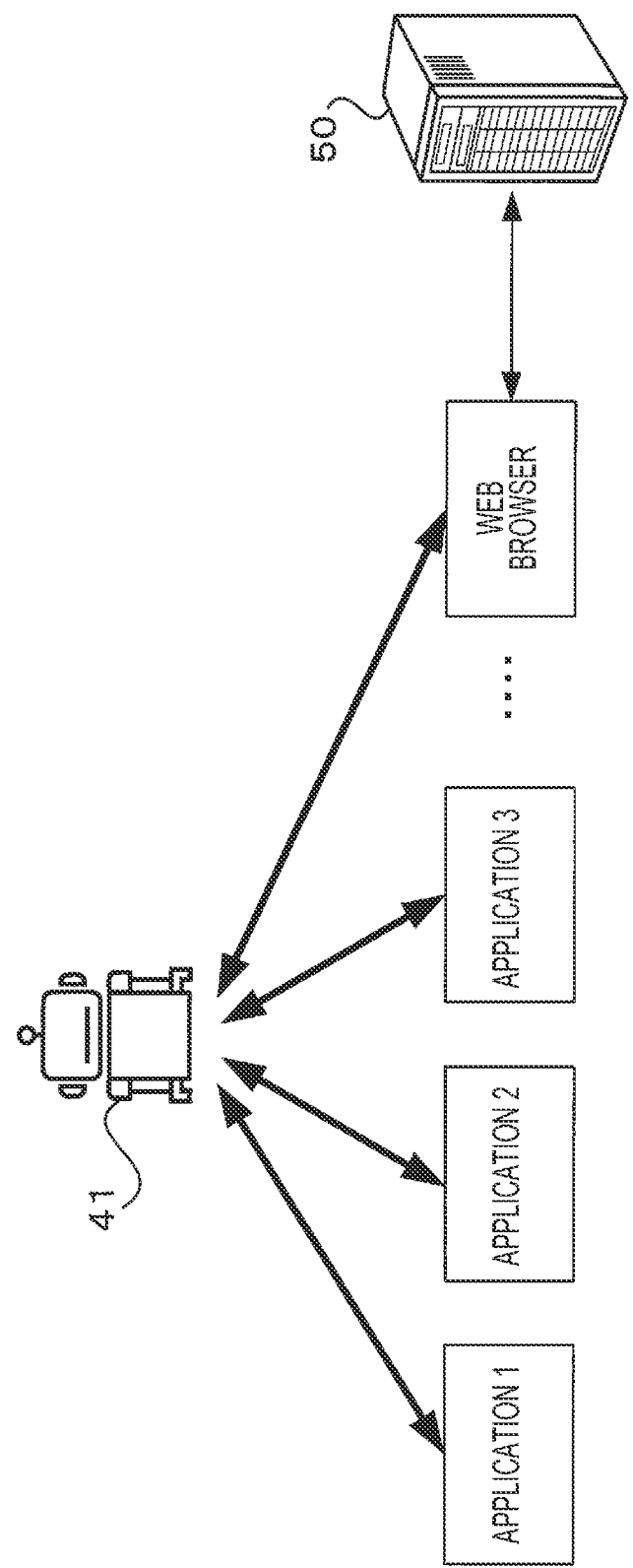
FIG. 2 illustrates operations in a terminal apparatus of RPA.

As illustrated in FIG. 2, the RPA 41 is a routine task automation assist program for automatically executing a specific routine task without user's operation by automating a process for the routine task with various applications and a web browser.

Figure 3:
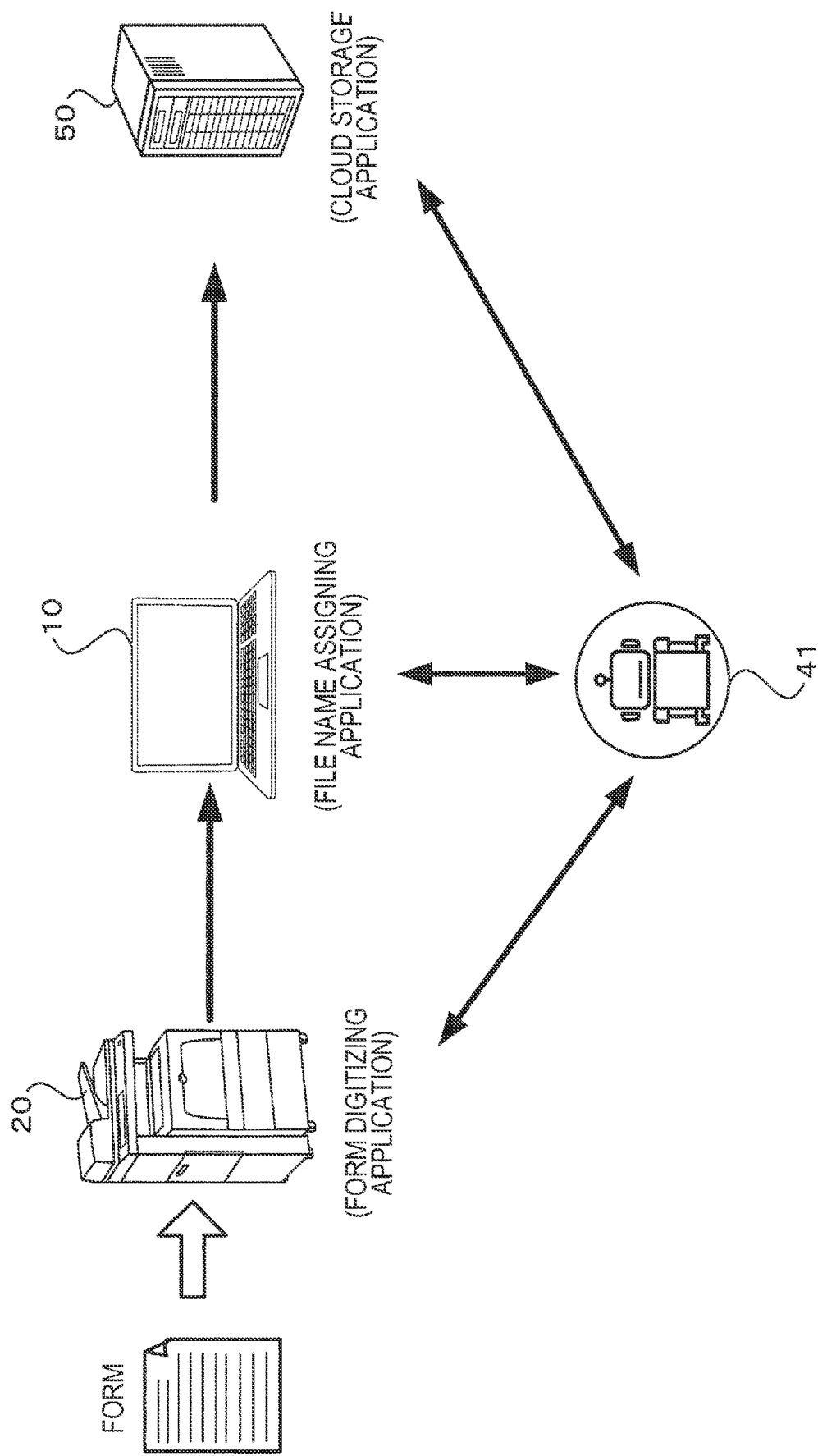
FIG. 3 illustrates an example in which the RPA achieves collaboration among three applications, that is, a form digitizing application, a file name assigning application, and a cloud storage application.

FIG. 3 illustrates an example in which the RPA 41 achieves collaboration among three applications, that is, a form digitizing application, a file name assigning application, and a cloud storage application.

The form digitizing application has a function of automatically digitizing various forms by scanning the forms with the image forming apparatus 20. The file name assigning application has a function of assigning a preset file name to digitized form data. The cloud storage application has a function of storing pieces of digitized form data in a specified storage area of the cloud server 50 in such a manner that folders are automatically created in the storage area and the pieces of form data are sorted into the folders based on attributes of the pieces of form data.

To achieve the collaboration among the plurality of applications, it is necessary to make settings on the RPA 41 about the collaboration and settings on operation parameters. For example, to achieve the collaboration among the three applications illustrated in FIG. 3, it is necessary to make settings on the RPA 41 about the collaboration and settings on operation parameters.

Figure 4:
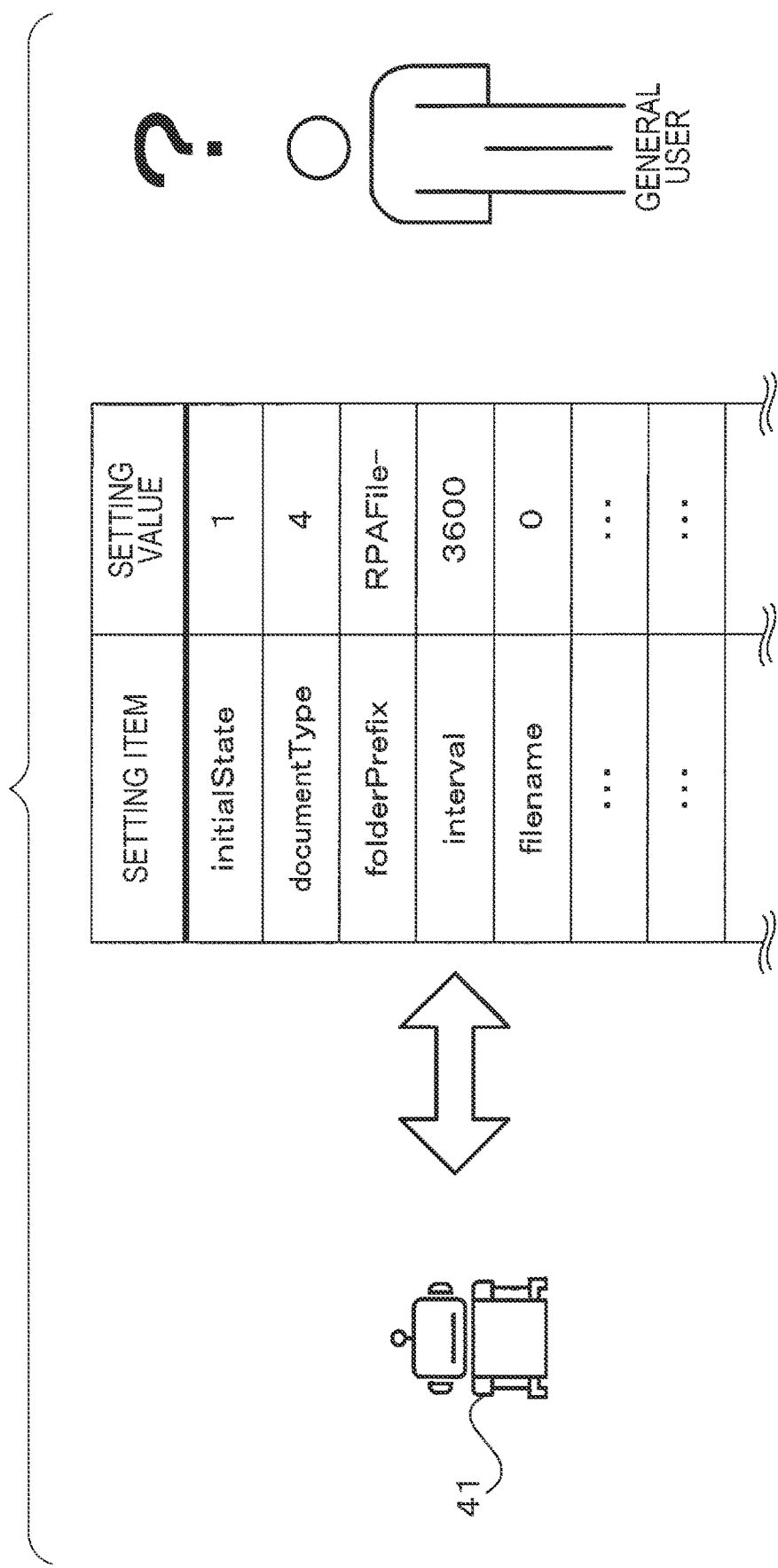
FIG. 4 demonstrates that the RPA has many setting items that only developers or experts may set.

As illustrated in FIG. 4, the RPA 41 has many setting items that only developers or experts may set. Therefore, general users have difficulty in understanding what kind of setting value to input for a particular setting item to achieve collaboration among the plurality of applications. The setting items are formatted so that the RPA 41 may understand the setting items. Therefore, general users without IT skills have difficulty in understanding the setting items.

To implement specific functions by causing the plurality of applications to collaborate using the RPA 41 as the routine task automation assist software program, general users have difficulty in making settings on the RPA 41 about the collaboration.

Examples of the settings related to the collaboration among the plurality of applications include a setting of a method for handling errors that may occur during the collaboration, and a setting of a method for handling unexpected events. To achieve the collaboration among the plurality of applications, it is necessary to make in advance, as the settings related to the collaboration, a setting of a method for handling a case where a prohibited character is used in a file name of file data to be processed, and a setting of a method for handling a case where a folder having a specified name does not exist in a specified storage area.

To achieve the collaboration among the plurality of applications, it is necessary to input operation parameters that define operations of the applications. The operation parameter is any type of information such as values or characters that define an operation of an application. Specifically, the operation parameter is information indicating a file name to be assigned to a digitized form, information indicating a transfer destination of a digitized file after a process, or information indicating a storage area and a layer where a file is stored.

Figure 5:
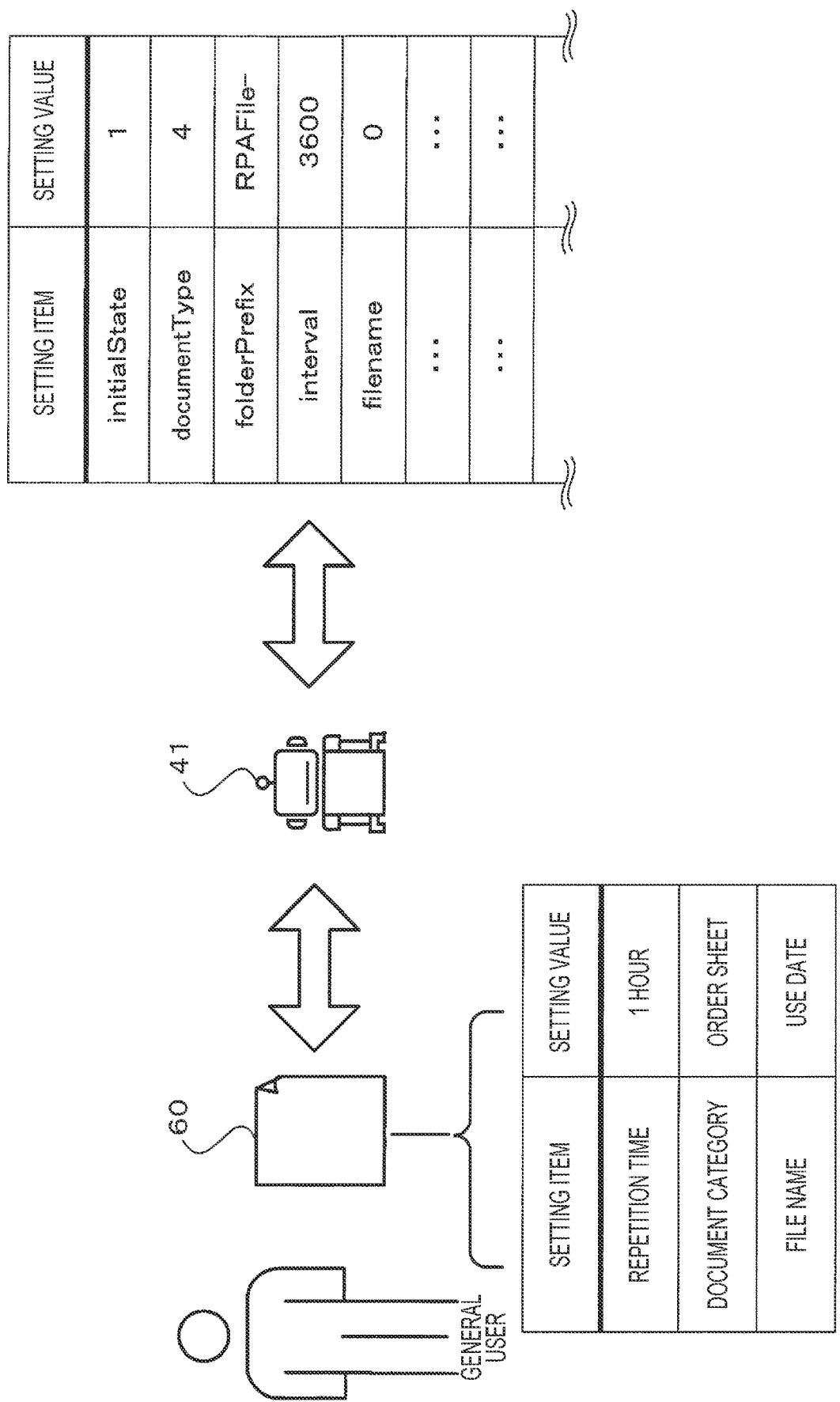
FIG. 5 demonstrates that a user inputs operation parameters as setting values for setting items in a setting file.

In the information processing system of this exemplary embodiment, a user may only input a minimum number of necessary operation parameters to a setting file 60 as illustrated in FIG. 5.

This exemplary embodiment is directed to an example in which the setting file 60 is a file in an Excel format. Excel is spreadsheet software of Microsoft Corporation. The setting file 60 is not limited to a file in the Excel format, and any file format may be employed as long as the user may input setting values to the file.

In FIG. 5, the user inputs, as the setting values, only operation parameters "1 hour", "order sheet", and "use date" for setting items "repetition time", "document category", and "file name" in the setting file 60, respectively. The RPA 41 reads and acquires the input operation parameters from the setting file 60 and implements operations by causing the plurality of applications to collaborate based on the acquired operation parameters and presettings related to the collaboration.

FIG. 6 illustrates an example of the setting file 60. In the setting file illustrated in FIG. 6, operation parameters are input for settings of the name of a file to be uploaded to a storage, and settings of a storage area where the file stored.

Specifically, values "client name", "issue date", "document name", and "document number" are input for the settings of the name of the file to be uploaded to the storage, and "hyphen" is set as a delimiter in the file name.

That is, the operation parameters are input to the setting file illustrated in FIG. 6 so that a file name "client name-issue date-document name-document number" is assigned to the digitized file.

For the settings of the storage area where the file is stored, a value "3" is input as the number of layers of folders to be created in the storage, and values "year", "client name", and "document name" are input as names of the layers, that is, folder names.

That is, the operation parameters are input to the setting file illustrated in FIG. 6 so that folders are created in three layers "year", "client name", and "document name" and the file is stored.

To implement operations by causing the plurality of applications to collaborate as illustrated in FIG. 3, the RPA 41 acquires the operation parameters from the setting file 60 as illustrated in FIG. 7.

Figure 8:
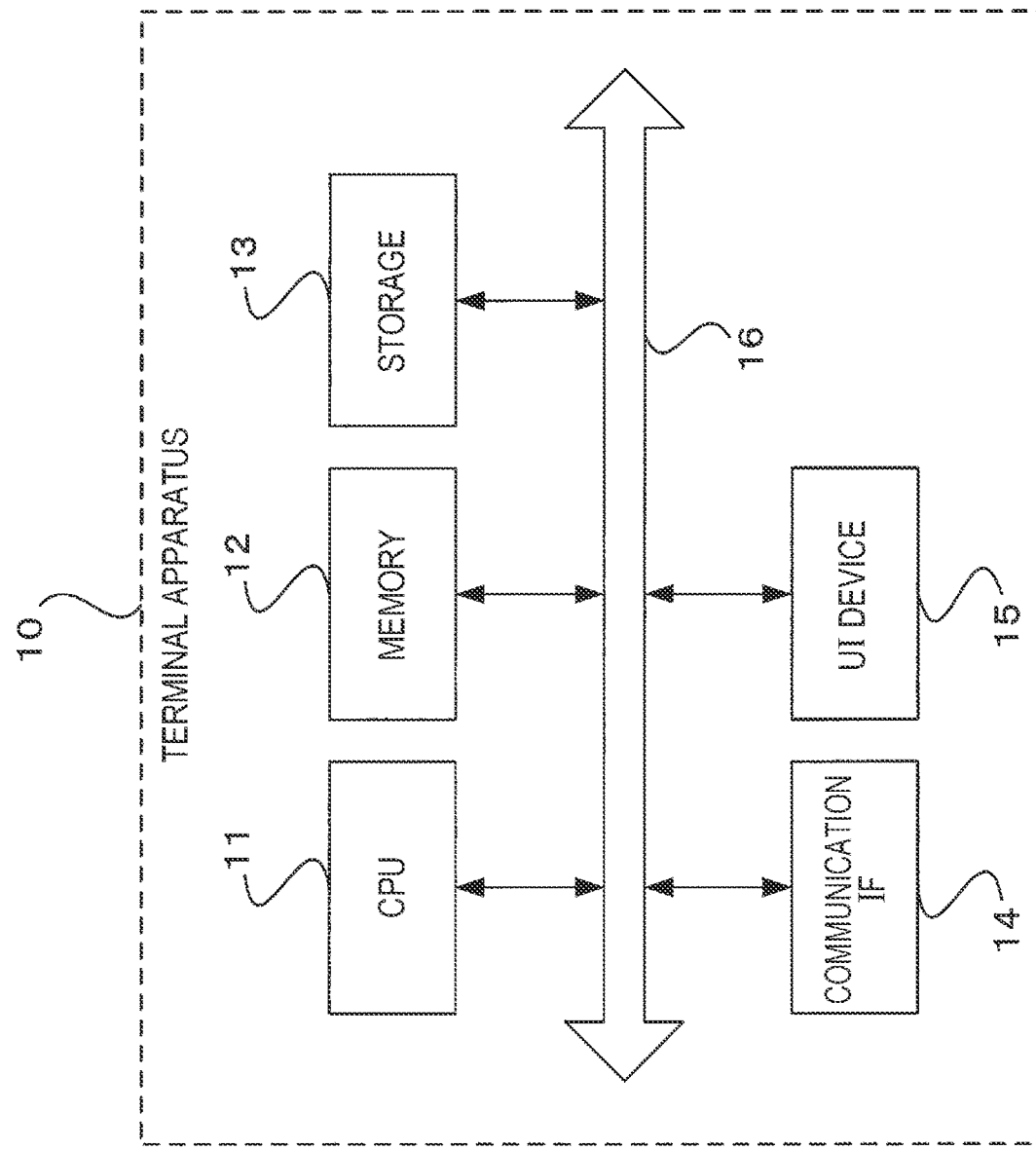
FIG. 8 is a block diagram illustrating the hardware configuration of the terminal apparatus according to the exemplary embodiment of the present disclosure.

FIG. 8 illustrates the hardware configuration of the terminal apparatus 10 in the information processing system of this exemplary embodiment.

As illustrated in FIG. 8, the terminal apparatus 10 includes a CPU 11, a memory 12, a storage 13 such as a hard disk drive, a communication interface (IF) 14 that transmits data to and receives data from an external apparatus via the network 30, and a user interface (UI) device 15 including a touch panel or a combination of a liquid crystal display and a keyboard. Those components are connected via a control bus 16.

The CPU 11 is a processor that executes a predetermined process based on a control program stored in the memory 12 or the storage 13 to control operations of the terminal apparatus 10. In this exemplary embodiment, the CPU 11 reads and executes the control program stored in the memory 12 or the storage 13, but the program may be provided to the CPU 11 by being stored in a storage medium such as a CD-ROM.

Figure 9:
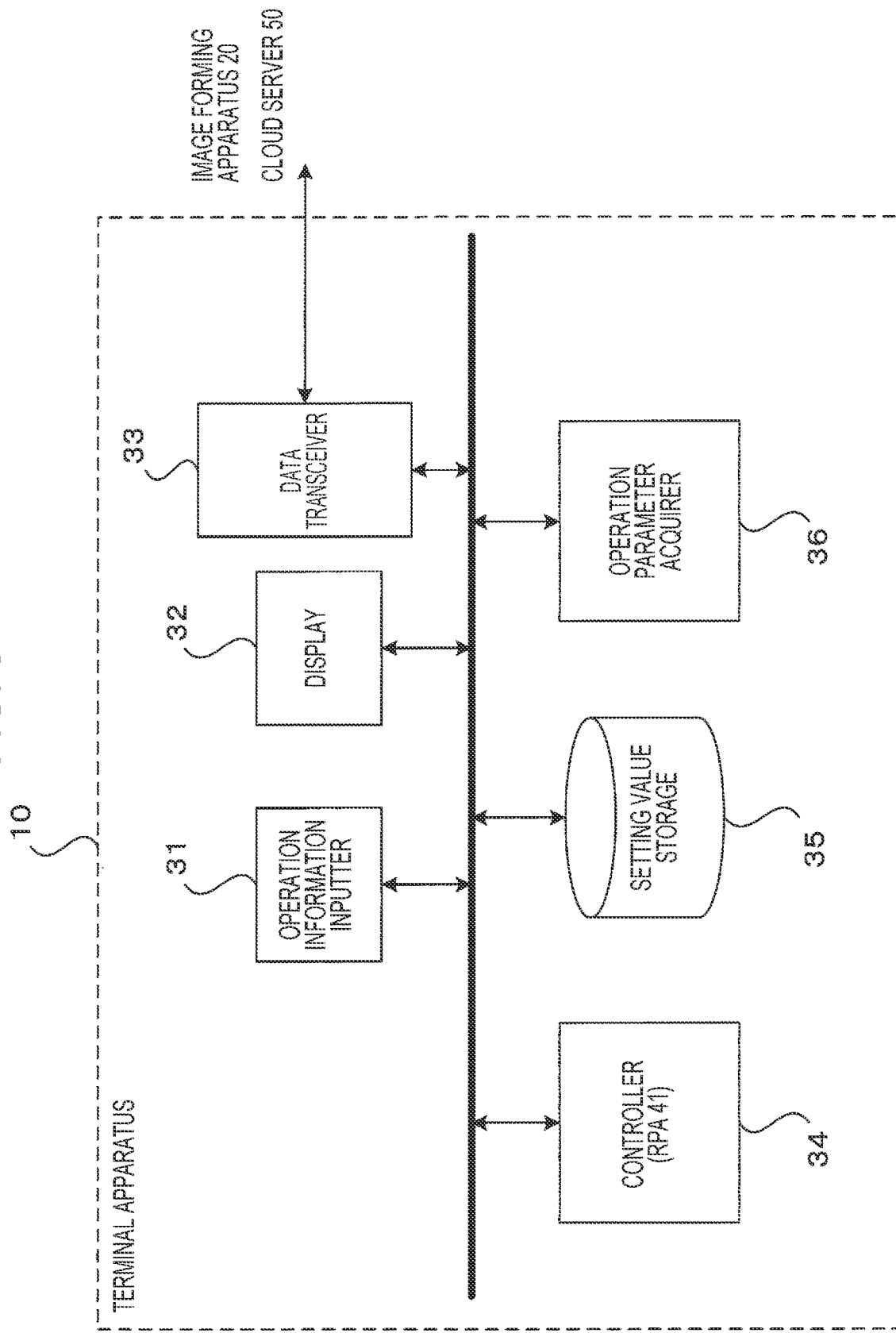
FIG. 9 is a block diagram illustrating the functional configuration of the terminal apparatus according to the exemplary embodiment or the present disclosure.

FIG. 9 is a block diagram illustrating the functional configuration of the terminal apparatus 10 that is implemented by executing the control program.

As illustrated in FIG. 9, the terminal apparatus 10 of this exemplary embodiment includes an operation information inputter 31, a display 32, a data transceiver 33, a controller 34, a setting value storage 35, and an operation parameter acquirer 36.

The operation information inputter 31 receives various types of operation information input by the user. The display 32 is controlled by the controller 34 to display various types of information for the user.

The data transceiver 33 exchanges data with external apparatuses such as the image forming apparatus 20 and the cloud server 50.

The operation parameter acquirer 36 receives and acquires operation parameters input by the user via the system. The operation parameters acquired by the operation parameter acquirer 36 are stored in the setting value storage 35. The setting value storage 35 also stores setting values related to presettings of collaboration among the plurality of applications.

The controller 34 controls the overall operation of the terminal apparatus 10. When the controller 34 functions as the RPA 41, the controller 34 implements various functions by causing the plurality of applications to collaborate.

The controller 34 implements specific functions by causing the plurality of applications to collaborate based on the presettings related to the collaboration and the operation parameters input by the user via the system. Those presettings and operation parameters are stored in the setting value storage 35.

Specifically, the operation parameter input by the user via the system is a setting value input by the user to a file such as the setting file 60.

Next, operations of the terminal apparatus 10 of this exemplary embodiment are described in detail with reference to the drawings.

The following description is directed to a case where the three applications illustrated in FIG. 3 collaborate to implement the processes in which the form digitizing application digitizes various forms by reading the forms with the image forming apparatus 20, the file name assigning application assigns file names to pieces of digitized form data, and the cloud storage application stores the pieces of digitized form data in the cloud server 50.

The user has input operation parameters to the setting file 60 as illustrated in FIG. 6 to cause the three applications to collaborate.

Figure 10:
FIG. 10 illustrates an example of a form to be processed by causing the three applications to collaborate.

FIG. 10 illustrates an example of the form to be processed by causing the three applications to collaborate.

To achieve the collaboration among the three applications, the RPA 41 first causes the form digitizing application to convert a form into a digitized file by reading the form with the image forming apparatus 20. The RPA 41 causes the file name assigning application to acquire various types of information in the form by executing optical character reading (OCR) on the digitized file.

Figure 11:
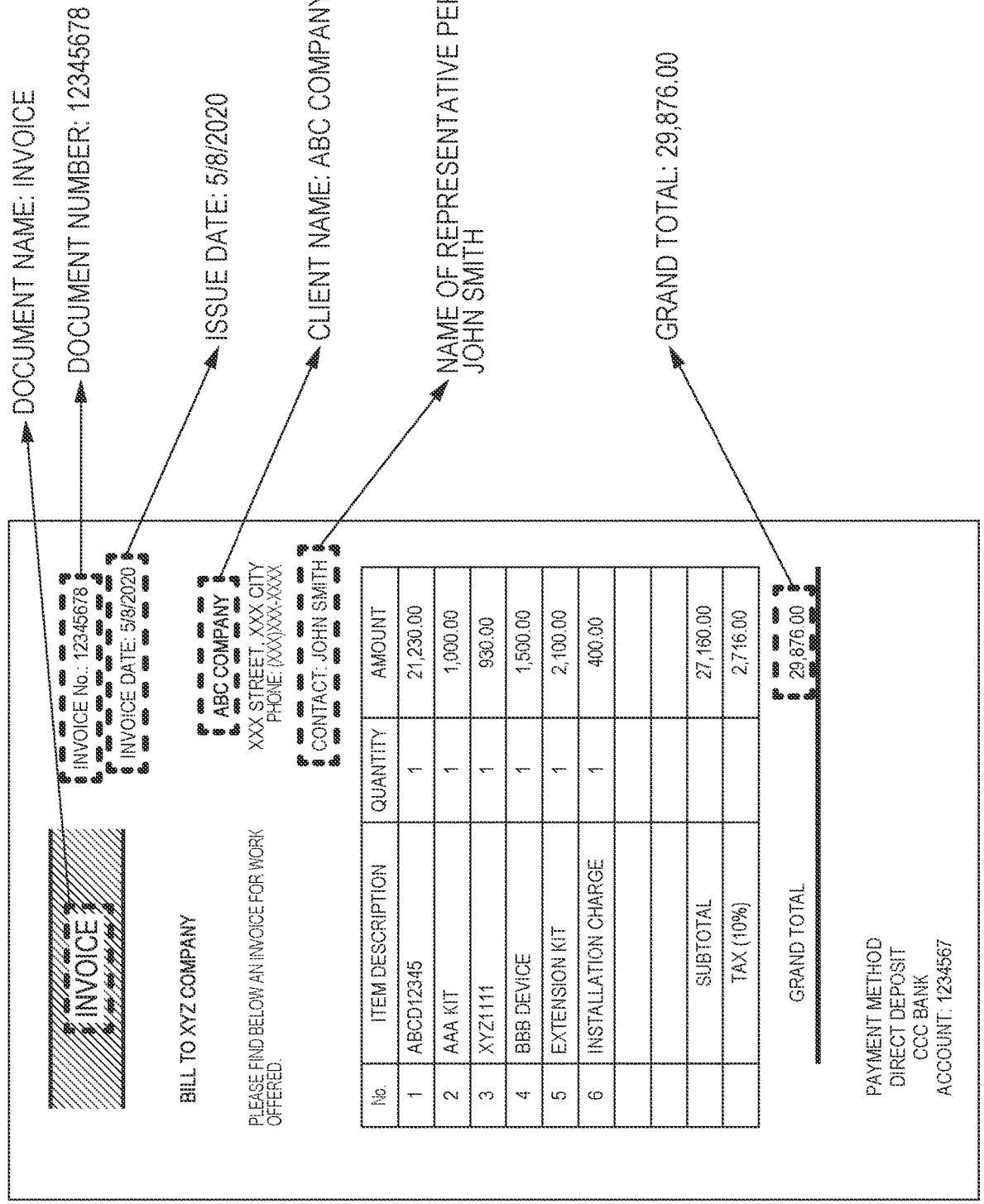
FIG. 11 demonstrates that the RPA causes the file name assigning application to acquire various types of information in the form by executing OCR on a digitized file.

FIG. 11 demonstrates that the RPA 41 causes the file name assigning application to acquire various types of information in the form by executing OCR on the digitized file.

FIG. 11 demonstrates that the RPA 41 causes the file name assigning application to acquire various types of information from the digitized file, such as "document name", "document number", "issue date", "client name", "name of representative person", and "grand total".

For example, the RPA 41 converts the various types of acquired information into a comma separated value (CSV) file as illustrated in FIG. 12.

The RPA 41 causes the file name assigning application to generate a name based on the operation parameters in the setting file 60 illustrated in FIG. 6 and assign the generated file name to the digitized form file.

In the example of the setting file 60 illustrated in FIG. 6, values "client name", "issue date", "document name", and "document number" are input and "hyphen" is set as a delimiter in the file name.

Therefore, the RPA 41 causes the file name assigning application to assign a file name "ABC company-05082020-invoice-12345678" to the digitized form file for which the CSV file has been generated as illustrated in FIG. 12.

FIG. 13 illustrates examples of the digitized file to which the file name is assigned.

Next, the RPA 41 causes the cloud storage application to execute a process for storing the digitized file having the file name in a specified storage area based on the operation parameters input to the setting file 60 illustrated in FIG. 6.

In the setting file 60 illustrated in FIG. 6, for the settings of the storage area where the file is stored, a value "3" is input as the number of layers of folders to be created in the storage, and values "year", "client name", and "document name" are input as names of the layers, that is, folder names.

Figure 14:
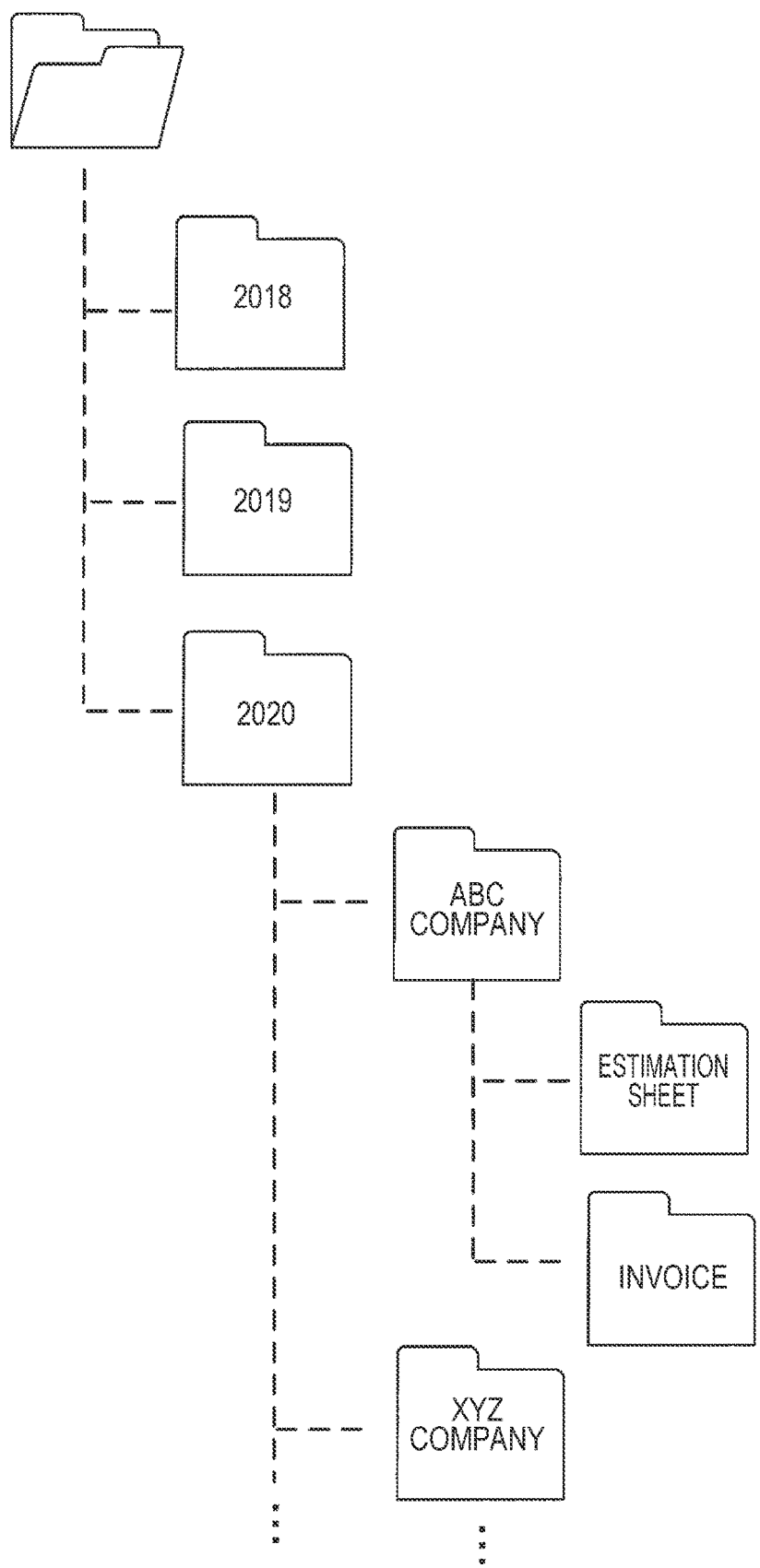
FIG. 14 illustrates a hierarchical structure generated in a specified storage folder in a cloud server with the cloud storage application by the RPA.

Therefore, the RPA 41 causes the cloud storage application to create subfolders having a hierarchical structure illustrated in FIG. 14 in a specified storage folder in the cloud server 50.

Specifically, the RPA 41 creates "year" folders such as "2018", "2019", and "2020" folders in the specified storage folder, creates "client name" folders such as "ABC company" and "XYZ company" folders in a layer below the "year" folders, and creates "document name" folders such as "estimation sheet" and "invoice" folders in a layer below the "client name" folders.

For example, the RPA 41 causes the cloud storage application to store the digitized file "ABC company-05082020-invoice-12345678" in the "invoice" folder in the "ABC company" folder in the "2020" folder.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiments above, and may be changed.

MODIFIED EXAMPLE

In the exemplary embodiment described above, the RPA that is the routine task automation assist program achieves collaboration among a plurality of applications for executing processes on forms. The collaboration may be achieved by using a software program other than the RPA.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to:
provide a setting file for a user to input operation parameters that define a predetermined sequence of a plurality of different processes, wherein the plurality of different processes are respectively performed by a plurality of different applications that operate independently;
read the setting file to acquire the operation parameters input by the user; and
implement specific functions by causing the plurality of different applications that operate independently to collaborate to respectively perform the plurality of different processes on a file based on the operation parameters read from the setting file, wherein the plurality of different applications comprise a first application and a second application, wherein the predetermined sequence of the plurality of different processes comprises a second process subsequent to a first process, and wherein the first application performs the first process on the file, and the second application performs the second process subsequent to the first process on the file, wherein the plurality of different applications comprise a form digitizing application, a file name assigning application, and a storage application, and wherein the plurality of different processes comprise converting a form into digitalized form data by the form digitizing application, assigning a file name to the digitalized form data by the file name assigning application, and storing the digitalized form data in a storage device with the file name by the storage application.

2. The information processing apparatus according to claim 1, wherein the operation parameters are setting values input to the file by the user.

3. The information processing apparatus according to claim 1, wherein the form digitizing application scans the form by using an image forming apparatus to generate the digitalized form data.

4. The information processing apparatus according to claim 1, wherein the storage application stores the digitalized form data in a predetermined storage area of a server.

5. The information processing apparatus according to claim 4, wherein the storage application creates a folder in the predetermined storage area of the server and stores the digitalized form data in the folder.

6. A non-transitory computer readable medium storing a program causing a computer to execute a process comprising:

provide a setting file for a user to input operation parameters that define a predetermined sequence of a plurality of different processes, wherein the plurality of different processes are respectively performed by a plurality of different applications that operate independently;

read the setting file to acquire the operation parameters input by the user; and implementing specific functions by causing the plurality of different applications that operate independently to collaborate to respectively perform the plurality of different processes on a file based on the operation parameters read from the setting file, wherein the plurality of different applications comprise a first application and a second application, wherein the predetermined sequence of the plurality of different processes comprises a second process subsequent to a first process, and wherein the first application performs the first process on the file, and the second application performs the second process subsequent to the first process on the file, wherein the plurality of different applications comprise a form digitizing application, a file name assigning application, and a storage application, and wherein the plurality of different processes comprise converting a form into digitalized form data by the form digitizing application, assigning a file name to the digitalized form data by the file name assigning application, and storing the digitalized form data in a storage device with the file name by the storage application.

* * * * *